(12) United States Patent
Le et al.

(10) Patent No.: US 7,397,770 B2
(45) Date of Patent: Jul. 8, 2008

(54) CHECKING AND REPAIRING A NETWORK CONFIGURATION

(75) Inventors: Cuong Minh Le, Tucson, AZ (US);
David Michael Shackelford, Tucson, AZ (US); Gregory Edward McBride, Tucson, AZ (US); James Mitchell Ratliff, Benson, AZ (US); Kaladhar Voruganti, San Jose, CA (US); Sandeep Gopisetty, Morgan Hill, CA (US); Robert Beverley Basham, Aloho, OR (US); Dinesh C. Verma, New Castle, NY (US); Kang-Won Lee, Nanuet, NY (US); Dakshi Agrawal, Yorktown Heights, NY (US); Brent William Yardley, Beaverton, OR (US); Khalid Filali-Adib, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 727 days.

(21) Appl. No.: 10/783,435

(22) Filed: Feb. 20, 2004

(65) Prior Publication Data

US 2005/0185597 A1    Aug. 25, 2005

(51) Int. Cl.
*H04L 12/16* (2006.01)
(52) U.S. Cl. .................................................. 370/254
(58) Field of Classification Search ............... 370/254, 370/401, 229, 352, 400, 252, 389, 392, 409; 709/220, 223, 219, 229, 224, 237, 248; 707/3, 707/1, 10, 100, 102, 205, 200; 713/100; 705/1

See application file for complete search history.

(56) References Cited

U.S. PATENT DOCUMENTS

| | | | |
|---|---|---|---|
| 4,809,193 | A | 2/1989 | Jourjine |
| 5,889,953 | A | 3/1999 | Thebaut et al. |
| 5,909,540 | A | 6/1999 | Carter et al. |
| 5,987,506 | A | 11/1999 | Carter et al. |
| 6,028,984 | A | 2/2000 | Kimball |

(Continued)

FOREIGN PATENT DOCUMENTS

JP        03-145846        6/1991

(Continued)

OTHER PUBLICATIONS

Enrico Johansson, Martin Höst; Tracking degradation in software product lines through measurement of design rule violations, Jul. 2002, Proceedings of the 14th international conference on Software engineering and knowledge engineering SEKE '02 Publisher: ACM Press, pp. 249-253.*

*Primary Examiner*—Wing F. Chan
*Assistant Examiner*—Prenell P Jones
(74) *Attorney, Agent, or Firm*—Janaki K. Davda; Konrad Raynes & Victor LLP

(57) ABSTRACT

A technique for performing configuration checking of a network is provided. A network data store is scanned for at least one transaction. At least one event is generated for the transaction. At least one configuration policy is associated with the event. The configuration policy is compared with configuration data associated with the event. It is determined whether the configuration policy has been violated based on the comparison.

14 Claims, 7 Drawing Sheets

U.S. PATENT DOCUMENTS

| | | |
|---|---|---|
| 6,240,463 B1 | 5/2001 | Benmohamed et al. |
| 6,393,473 B1 * | 5/2002 | Chu .......................... 709/223 |
| 2002/0003780 A1 | 1/2002 | Braun et al. |
| 2002/0007468 A1 | 1/2002 | Kampe et al. |
| 2002/0032765 A1 | 3/2002 | Pezzutti |
| 2003/0061362 A1 * | 3/2003 | Qiu et al. .................... 709/229 |
| 2004/0028031 A1 * | 2/2004 | Valin et al. .................. 370/352 |
| 2005/0049993 A1 * | 3/2005 | Nori et al. ...................... 707/1 |
| 2005/0262233 A1 * | 11/2005 | Alon et al. .................. 709/223 |
| 2005/0278191 A1 * | 12/2005 | DiFalco et al. ................. 705/1 |
| 2006/0271526 A1 * | 11/2006 | Charnock et al. .............. 707/3 |
| 2007/0022124 A1 * | 1/2007 | Beadles et al. ................ 707/10 |

FOREIGN PATENT DOCUMENTS

| | | |
|---|---|---|
| JP | 09-160849 | 6/1997 |
| JP | 2000-209202 | 7/2000 |
| JP | 2002-042218 | 2/2002 |

* cited by examiner

CHECKING AND REPAIRING A NETWORK CONFIGURATION

BACKGROUND OF THE INVENTION

1. Field of the Invention

The present invention is related to checking and repairing a network configuration.

2. Description of the Related Art

A storage area network (SAN) may be described as a high-speed network or subnetwork that interconnects shared data storage devices with associated server computers that may be accessed by client computers. SANs are becoming a preferred storage architecture model for block storage systems in comparison to direct attached storage models for several reasons. For example, SANs allow multiple servers to directly share a block of storage devices and allow storage to be separately managed from the servers. Additionally, system administrators managing SANs do not need to purchase additional servers to increase storage capacity because additional data storage devices may be independently added.

In a complex network environment, such as a SAN, there are many sources of incompatibilities between components in the network. For example, a Host Bus Adapter (HBA) firmware level may conflict with the firmware in a switch to which the HBA is connected. An HBA may be described as an I/O adapter that resides between a host bus and a Fibre Channel loop and that manages the transfer of information between the host bus and the Fibre Channel loop. A switch may be described as residing between segments of a network, and the switch receives data packets, determines the destination of the data packets, and forwards the data packets on to their destinations. A Fibre Channel loop may be described as a serial data transfer architecture. In another example, a device driver may not be configured properly to fully utilize the capabilities of a storage device. A device driver may be described as a program that controls a device. Determining all of the possible problems in a SAN is a manual and often error-prone task. Furthermore, applying the correct change to alleviate a problem is also error prone and may result in a problem becoming worse.

Also, configuring a SAN is a time consuming and difficult task because of many interoperability constraints between devices from different vendors that a system administrator needs to be aware of. Typically, vendors create SAN devices so that the SAN devices interoperate with devices and services of strategic partners of the vendors, and this is done to gain competitive advantage over other vendors. Also, the interoperability constraints are constantly changing, and, therefore, it is difficult for a system administrator to keep abreast of the changes.

Therefore, in order to leverage the benefits of SANs, system administrators should be able to easily manage SANs. Thus, SAN management software is usually deployed along with every SAN installation. One feature of a SAN management software tool is its ability to help a system administrator configure a SAN. One such SAN management software tool is IBM® Tivoli® Storage Area Network Manager (from International Business Machines Corporation), which provides topology discovery and display of the components and disk resources across the SAN and provides monitoring and problem identification to assist in the maintainability of the SAN.

Thus, a system administrator needs help selecting new storage devices to be purchased for a SAN to ensure that the new storage devices are compatible with the existing devices in the SAN. Also, when new storage devices are being configured into the SAN, the system administrator needs help configuring the new storage devices so that SAN configuration constraints that are specific to the particular SAN installation are not violated. For example, a SAN installation may have some specific rules pertaining to which devices should be grouped together in order to satisfy performance, reliability, and/or security concerns.

Although existing network management tools are useful, there is a need in the art for improved checking and repairing of a network, such as a SAN network.

SUMMARY OF THE INVENTION

Provided are a method, system, and program for performing configuration checking of a network. A network data store is scanned for at least one transaction. At least one event is generated for said transaction. At least one configuration policy is associated with said event. Said configuration policy is compared with configuration data associated with said event. It is determined whether said configuration policy has been violated based on the comparison.

Also provided are a method, system, and program for performing proactive configuration checking of a network. A hypothetical network scenario is received. At least one transaction is generated based on the hypothetical network scenario. A network data store is populated with configuration data for said transaction. At least one event is generated for said transaction using a mapping of events to transactions. Configuration data associated with said event is used to determine whether a configuration policy has been violated.

Moreover, provided are a method, system, and program for performing reactive configuration checking of a network. A request to perform configuration checking on an existing network configuration is received. A network data store is scanned for at least one transaction. At least one event is generated for said transaction using a mapping of events to transactions. Configuration data associated with said event is used to determine whether a configuration policy has been violated.

Furthermore, provided are a method, system, and program for correcting a configuration problem. The configuration problem is detected. It is determined whether there is at least one solution for the configuration problem in a knowledge data store. When it is determined that there is at least one solution in the knowledge data store, automatically selecting a solution to solve the configuration problem. When said solution can be automatically applied, automatically applying said solution. When said solution cannot be automatically applied, notifying a user.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several implementations of the present invention. It is understood that other implementations may be utilized and structural and operational changes may be made without departing from the scope of the present invention.

Implementations of the invention provide an autonomic configuration system that allows a system administrator to identify potential network and/or storage related configuration problems due to the potential addition of new components (e.g., software or hardware components) into a network (e.g., a SAN). Also, the autonomic configuration system automatically downloads the latest configuration constraints (e.g., configuration policies) from an interoperability site (e.g., similar to how patches for new viruses may be distributed) or a data store that is maintained by, for example, experts in the field of systems management. The configuration policies are stored in a policy data store that is accessible by the autonomic configuration system. In certain implementations, the configuration policies are based on a CIM-SNIA/SMIS virtual storage model.

The autonomic configuration system can either automatically or via explicit invocation determine whether a hypothetical or an existing configuration is violating any of the specified configuration policies. The autonomic configuration system may generate alert events and/or notification messages to inform the system administrator about the configuration errors. The autonomic configuration system may also highlight the network and/or storage related configuration problems via a network topology viewer.

Implementations of the invention provide an autonomic configuration system for detecting incompatibilities in a network environment, and, if a correct solution for an incompatibility is available, the autonomic configuration system applies the solution automatically.

Implementations of the invention allow configuration checking to be invoked using temporal relationships (e.g., every 12 hrs or every 5 minutes), invoked manually (e.g., by users), or invoked by tools (e.g., a planner tool). Moreover, implementations of the invention perform configuration checking on point in time network (e.g., SAN) data and/or on historical data, which describes at least one previous version of the SAN.

Figure 1:
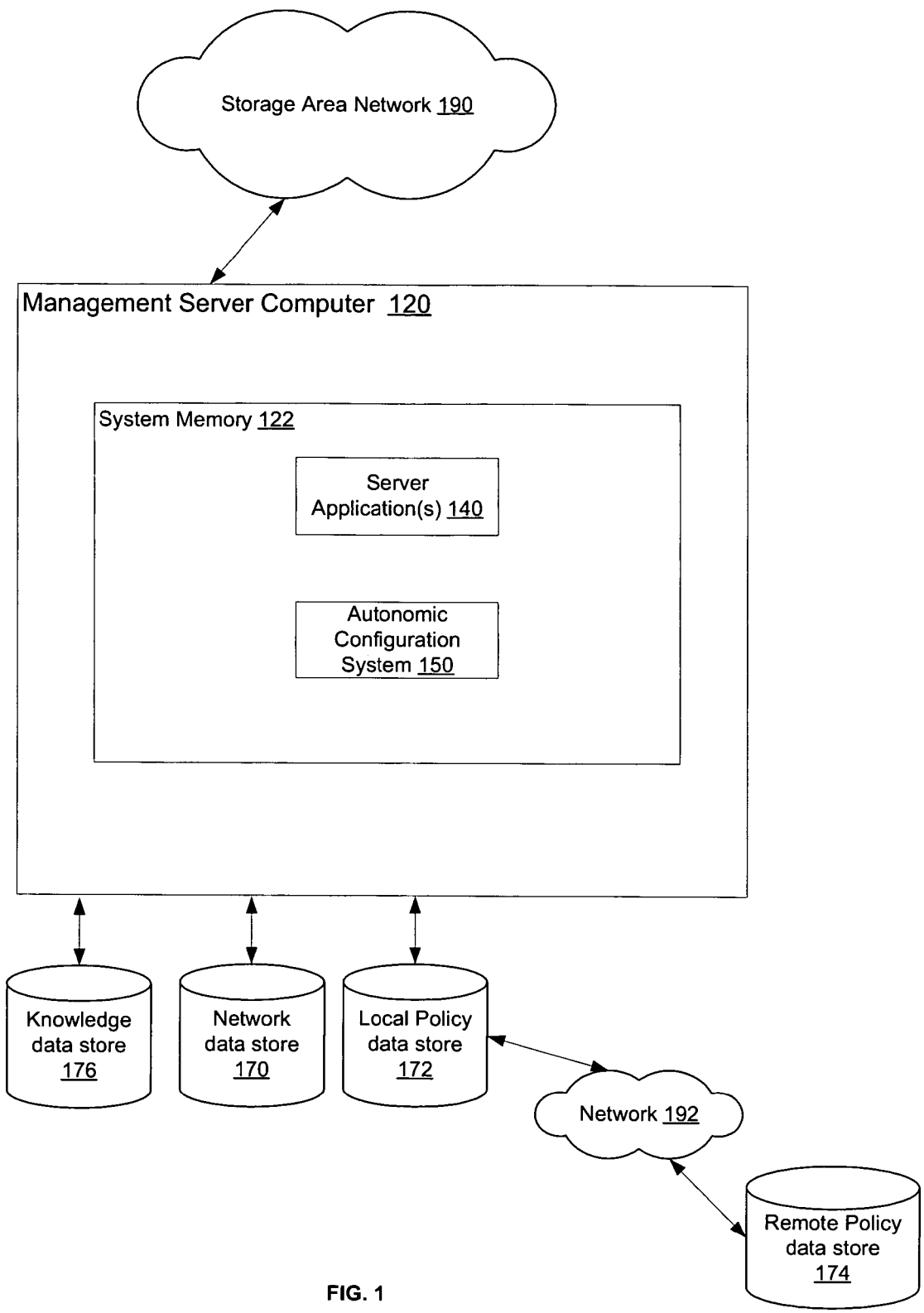
FIG. 1 illustrates, in a block diagram, a computing environment in accordance with certain implementations of the invention.

FIG. 1 illustrates, in a block diagram, a computing environment in accordance with certain implementations of the invention. A management server computer 120 is connected to a network 190 to which other components (e.g., software or hardware devices) are connected. The network 190 may comprise any type of network, such as, for example, a Storage Area Network (SAN), a Local Area Network (LAN), Wide Area Network (WAN), the Internet, an Intranet, etc. Although examples herein may refer to a SAN, the examples are intended merely to enhance understanding of various implementations of the invention and are not meant to limit implementations of the invention to a SAN.

The management server computer 120 includes system memory 122, which may be implemented in volatile and/or non-volatile devices. An autonomic configuration system 150 executes in the system memory 122. Additionally, at least one server application 160 executes in system memory 122.

The management server computer 120 is connected to a network data store 170, a local policy data store 172, and a knowledge data store 176. Data in the local policy data store 172 may be updated with data in a remote policy data store 174 via a network 192.

The network data store 170 holds existing configuration data. In certain implementations of the invention, components within the network can report their characteristics, such as firmware level, device driver level, and configuration data, for storage in the network data store 170. The autonomic configuration system 150 may deploy at least one agent to monitor components, and, when certain activities take place at the components, the agents send data back to the autonomic configuration system 150 and stored in network data store 170.

For example, the Storage Management Initiative Standard (SMIS) describes a standard for data storage software in which components within a SAN report their characteristics. The SMIS was created by a group referring to themselves as the Partner Development Program (PDP), all of whom were members of the Storage Networking Industry Association (SNIA). With SMIS, methods are provided by components of the SAN to update attributes that affect compatibility, such as firmware level and configuration data.

A data store may be, for example, a database. Although separate data stores 170, 172, 174, 176 are illustrated for ease of understanding, data in the data stores 170, 172, 174, 176 may be stored in fewer or more data stores connected to management server computer 120 or in data stores at other computers connected to management server computer 120.

Each data store 170, 172, 174, 176 may comprise an array of storage devices, such as Direct Access Storage Devices (DASDs), Just a Bunch of Disks (JBOD), Redundant Array of Independent Disks (RAID), virtualization device, etc.

Figure 2:
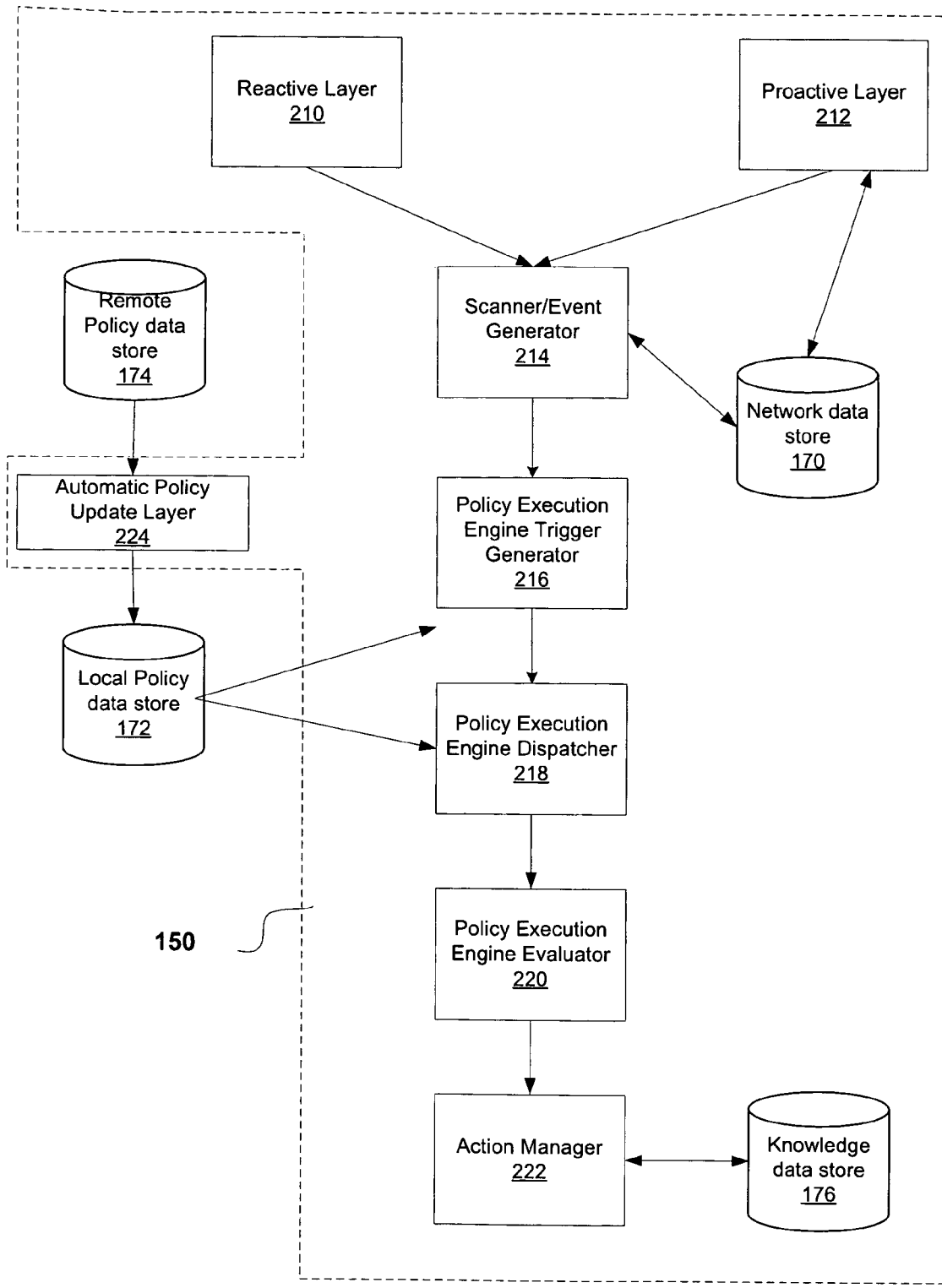
FIG. 2 illustrates, in a block diagram, further details of an autonomic configuration system in accordance with certain implementations of the invention.

FIG. 2 illustrates, in a block diagram, further details of an autonomic configuration system 150 in accordance with certain implementations of the invention. Although components 210, 212, 214, 216, 218, 220, and 222 are illustrated as separate components of an autonomic configuration manager 150, the functionality of the components 210, 212, 214, 216, 218, 220, and 222 may be implemented in fewer or more or different components than those illustrated. Additionally, the functionality of at least one of the components 210, 212, 214, 216, 218, 220, and 222 may be implemented at a different computer that is connected to the management server computer 120.

Implementations of the invention allow for both proactive and reactive checking to be performed. A proactive layer 212 allows system administrators to create and check hypothetical scenarios about a new network configuration that they would like to create. A reactive layer 210 allows system administrators to specify characteristics for configuration checking of an existing network configuration.

An automatic policy update layer 224 contacts a remote policy data store 174 to get updates of the latest configuration policies, and the automatic policy update layer 224 stores these configuration policies in a local policy data store 172. A scanner-event generator layer 214 scans the network data store 170 for transactions and generates an event for at least one transaction. Example transactions include: Connect Host xyz to Switch 123; New card added to Host 1b6; Firmware code for Switch 902 updated; Components rezoned.

A scanner-event generator layer 214 scans the network data store 170 for at least one transaction and generates at least one event for the at least one transaction. In certain implementations, there is a mapping that associates at least one event with a valid transaction. For the transaction Connect Host xyz to Switch 123, an example event may be a Verify event, which is an event that obtains configuration data about Host xyz and Switch 123. The configuration data may identify the operating system of the host, the number of HBAs as the host, the firmware level of the switch, etc. The event and obtained configuration data are passed on to the policy execution/trigger generator 216.

In particular, after receiving a particular type of event and the corresponding data from the scanner/event generator 214, a policy execution/trigger generator 216 generates at least one type of trigger for the event. For the transaction Connect Host xyz to Switch 123 and Verify event, example triggers include: Host name—Switch name and Host location—Switch location. A trigger is also associated with the event from which the trigger was generated and with configuration data of that event.

A policy execution engine dispatcher ("dispatcher") 218 retrieves at least one configuration policy from the local policy data store 172 associated with the at least one trigger and caches the configuration policies in memory. In certain implementations, some triggers may not have associated configuration policies. Example configuration policies may be: Host xyz is in same location as Switch and Host xyz can not be connected to a Switch connected to another Host.

An evaluator 220 compares the at least one configuration policy with the configuration data associated with the event from which the trigger was generated to determine whether configuration policies have been violated. For the trigger Host location—Switch location, the evaluator 220 may compare the configuration policy Host xyz is in same location as Switch with the configuration data for Host xyz and Switch 123. If Host xyz and Switch 123 are not at the same location, then the configuration does not match the configuration policy. An action manager 222 performs at least one action based on the determinations by the evaluator 220.

Figure 3:
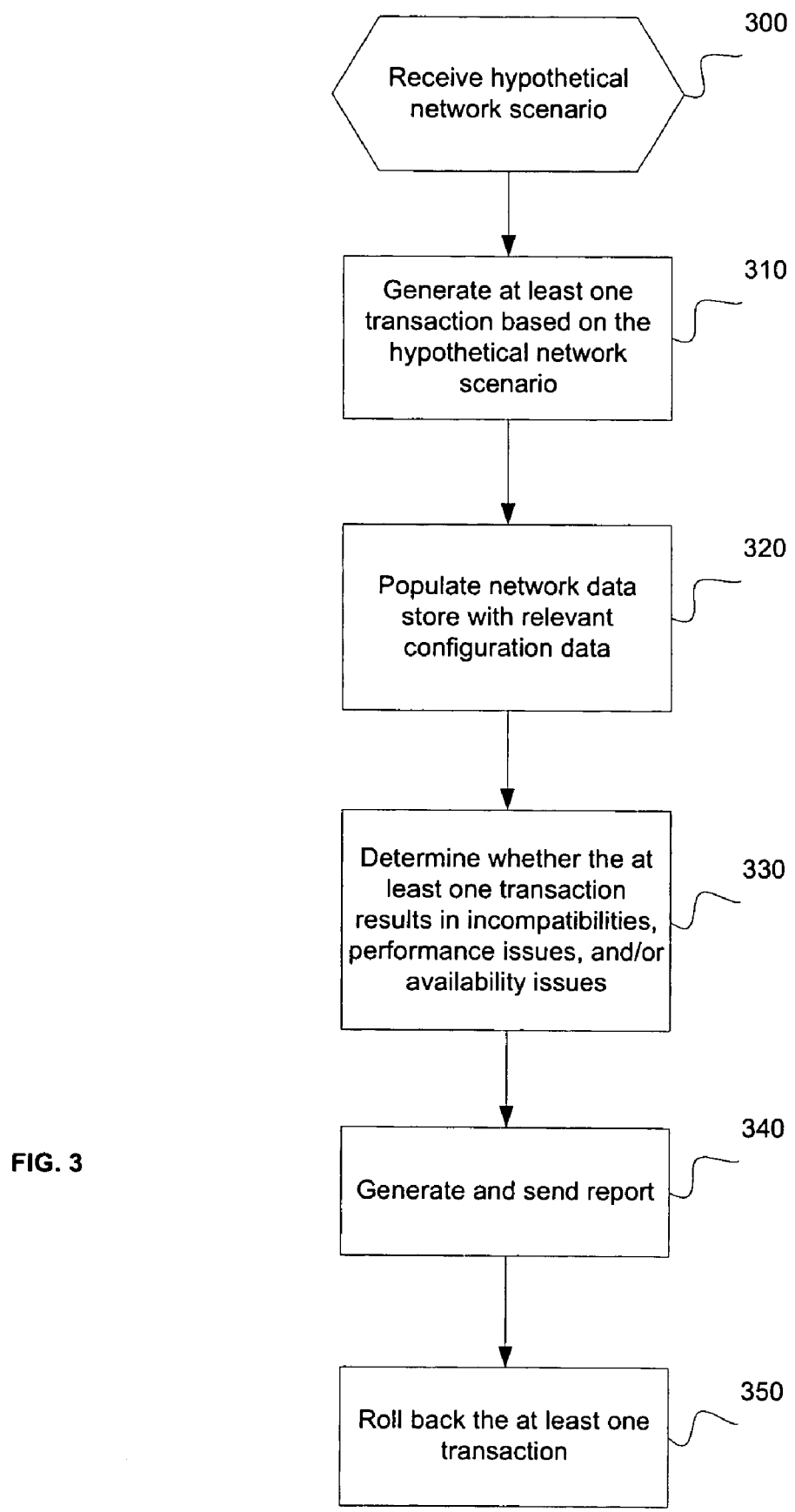
FIG. 3 illustrates logic for a proactive approach in accordance with certain implementations of the invention.

FIG. 3 illustrates logic for a proactive approach in accordance with certain implementations of the invention. Control begins at block 300 with receipt of a hypothetical network scenario created using the proactive layer 212. In certain implementations, a network topology may be created using a user interface provided by the proactive layer 212. In certain alternative implementations, a user may enter performance, availability, and other constraints via a user interface, and a network topology is automatically generated. In block 310, the proactive layer 212 creates at least one transaction based on the hypothetical network scenario. In block 320, the proactive layer 212 populates the network data store 170 with configuration data for the at least one transaction. In certain implementations, the proactive layer 212 stores configuration data for components that may be included in a network, such as host components, switches, etc. Then, if a transaction is: Connect Host xyz to Switch 123, then, the proactive layer 212 stores configuration data for Host xyz and Switch 123 into the network data store 170.

In block 330, components of the autonomic configuration system 150 determine whether the at least one transaction results in incompatibilities, performance issues, and/or availability issues. Incompatibilities may be described as conflicts between components. Performance issues may be described as issues relating to whether a desired performance level is met. Availability issues may be described as issues relating to whether there is a single point of failure anywhere in the network.

In block 340, components of the autonomic configuration system 150 generate and send a report. In block 350, the proactive layer 212 rolls back the at least one transaction to return the network data store 170 to a previous consistent state (i.e., to return the network data store 170 to the state it was in prior to creating the at least one transaction) by, for example, removing the added configuration data.

Figure 4:
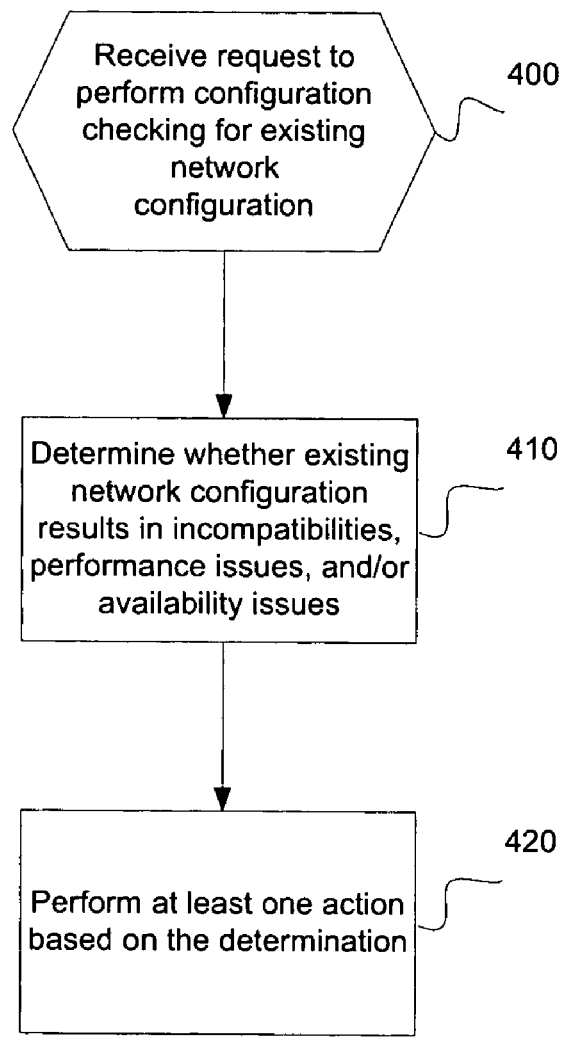
FIG. 4 illustrates logic for a reactive approach in accordance with certain implementations of the invention.

FIG. 4 illustrates logic for a reactive approach in accordance with certain implementations of the invention. Control begins at block 400 with the autonomic configuration system 150 receiving a request to perform a configuration check for an existing network configuration. In particular, the reactive layer 210 allows, for example, a system administrator, to specify characteristics for configuration checking of an existing network configuration. For example, the characteristics may specify zones of a network for which configuration checking is to be performed, components in the network for which configuration checking is to be performed, or a time interval (e.g. last 12 hours, etc.) for which configuration checking is to be performed. In block 410, for the specified characteristics, components of the autonomic configuration system 150 determine whether the existing network configuration results in incompatibilities, performance issues, and/or availability issues. In block 420, at least one action is performed by the action manager 222 based on the determination made in block 410.

Figure 5:
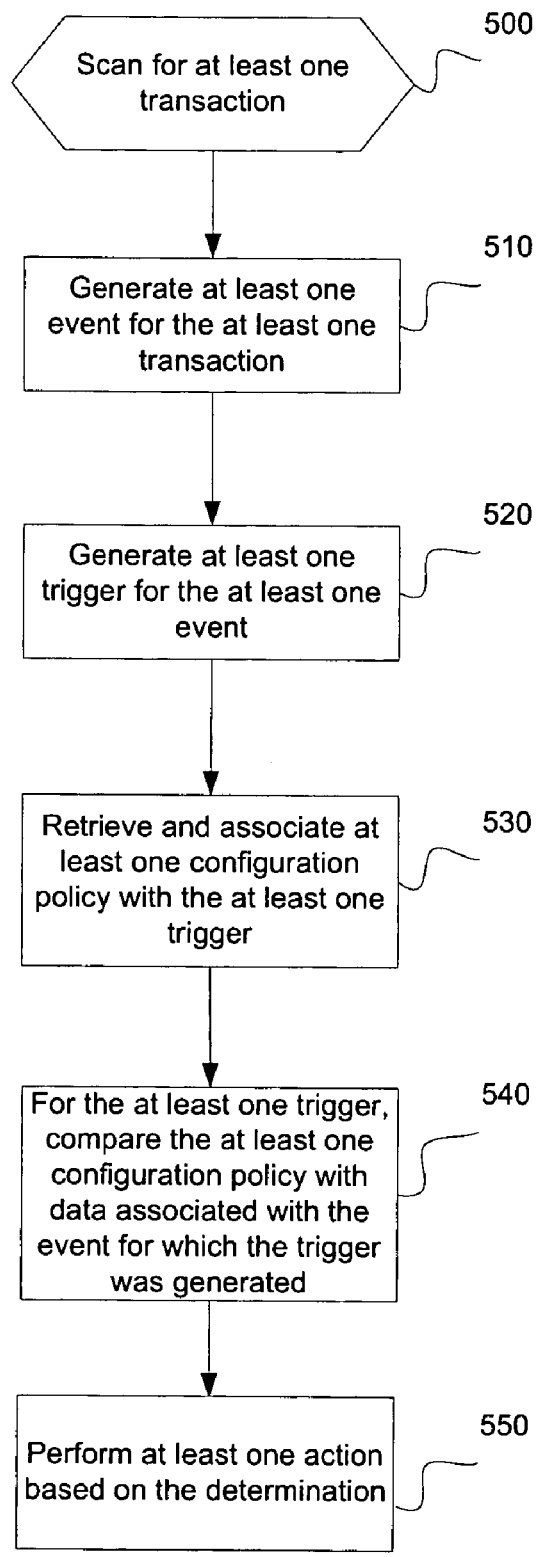
FIG. 5 illustrates logic for performing configuration checking in accordance with certain implementations of the invention.

FIG. 5 illustrates logic for performing configuration checking in accordance with certain implementations of the invention. Control begins at block 500 with the scanner of the scanner-event generator layer 214 scanning the network data store 170 for at least one transaction. In certain implementations, the scanner scans for new transactions. In block 510, the event generator of the scanner/event generator 214 generates at least one event for the at least one transaction. The at least one event may be generated using a mapping of transactions to events.

In certain implementations, the configuration policies may be classified as connection type, zone type, node type, loop type, or path performance type. Connection type policies indicate which components can and cannot be directly connected to each other. Zone type policies indicate which components can and cannot be in the same zone. A zone defines how data packets flow through ports among a group of components. For example, in one zone data packets may flow from a first port at Host Computer-A through a third port at Switch-B. Then, certain host computers may be prevented from using certain switch ports. Node type policies indicate which types of HBAs may reside at a particular host, and which combination of driver, firmware and operating system (OS) software are compatible. Loop type policies indicate which components can and cannot reside as part of a Fibre Channel arbitrated loop. Path performance type policies indicate what path-loading is appropriate for a given link or set of links.

If connection data (e.g., node A is connected to node B) is retrieved from the network data store 170, then the scanner/event generator layer 214 generates connection type events and sends the data about the two ends of the connection to a policy execution engine trigger generator ("trigger generator") 216. For a node (e.g., host computer, switch or storage array) in the network 190, the scanner/event generator layer 214 extracts relevant information about the node (e.g., software and hardware attributes) and sends that information to the trigger generator 216 as part of a node event. For a zone, the scanner/event generator layer 214 gets a list of all the components that are in the zone, and sends this information to the policy execution/trigger generator 216 as part of a zone event. For a loop in the network, the scanner/event generator layer 214 gets a list of all the components in the loop and sends this information to the policy execution/trigger generator 216 as part of a Loop event. For a inter-switch link, the scanner/event generator layer 214 gets a list of all paths through the link and sends loading information to the policy execution/trigger generator 216 as part of a path performance event.

In block 520, after receiving at least one event and corresponding configuration data from the scanner/event generator 214, a policy execution/trigger generator 216 generates at least one type of trigger for the at least one event. The term "trigger" may be described as an action represented by organizing data in a form that can be understood by the policy execution engine evaluator 220. For example, for a single zone event for a zone that has more than two components, the trigger generator 216 generates several different triggers. A trigger may represent a combination of two components in the zone under consideration. In such cases, for a single zone event consisting of "n" components, the trigger generator 216 generates the different combinations of size two, where each of the single combinations is represented by a trigger. Similarly, for node and connection events, the trigger generator 216 generates triggers that evaluate different combinations of software, firmware, and hardware characteristics.

In block 530, the policy execution engine dispatcher ("dispatcher") 218 retrieves at least one configuration policy from the local policy data store 172 and caches the at least one configuration policy in memory. In block 540, for the at least one type of trigger, the dispatcher 218 associates zero or more of the retrieved configuration policies with the trigger and sends the trigger and the associated configuration policies to a policy execution engine evaluator ("evaluator") 220.

In block 540, for the at least one trigger, the evaluator 220 compares the configuration policies with the trigger supplied data to determine whether configuration policies have been violated.

In block 550, an action manager 222 performs at least one action based on the determinations by the evaluator 220. In certain implementations, if a configuration policy has been violated, the action manager 222, takes an appropriate action that has been specified in the configuration policy, such as logging the violation, generating policy violation events, sending notifications (e.g., sending an email to a system administrator), or highlighting certain portions of a network topology viewer that graphically depicts the network. In certain implementations, the action manager 222 automatically corrects the violation. For example, the action manager may retrieve data from the knowledge data store 176 and apply a solution.

Figure 6:
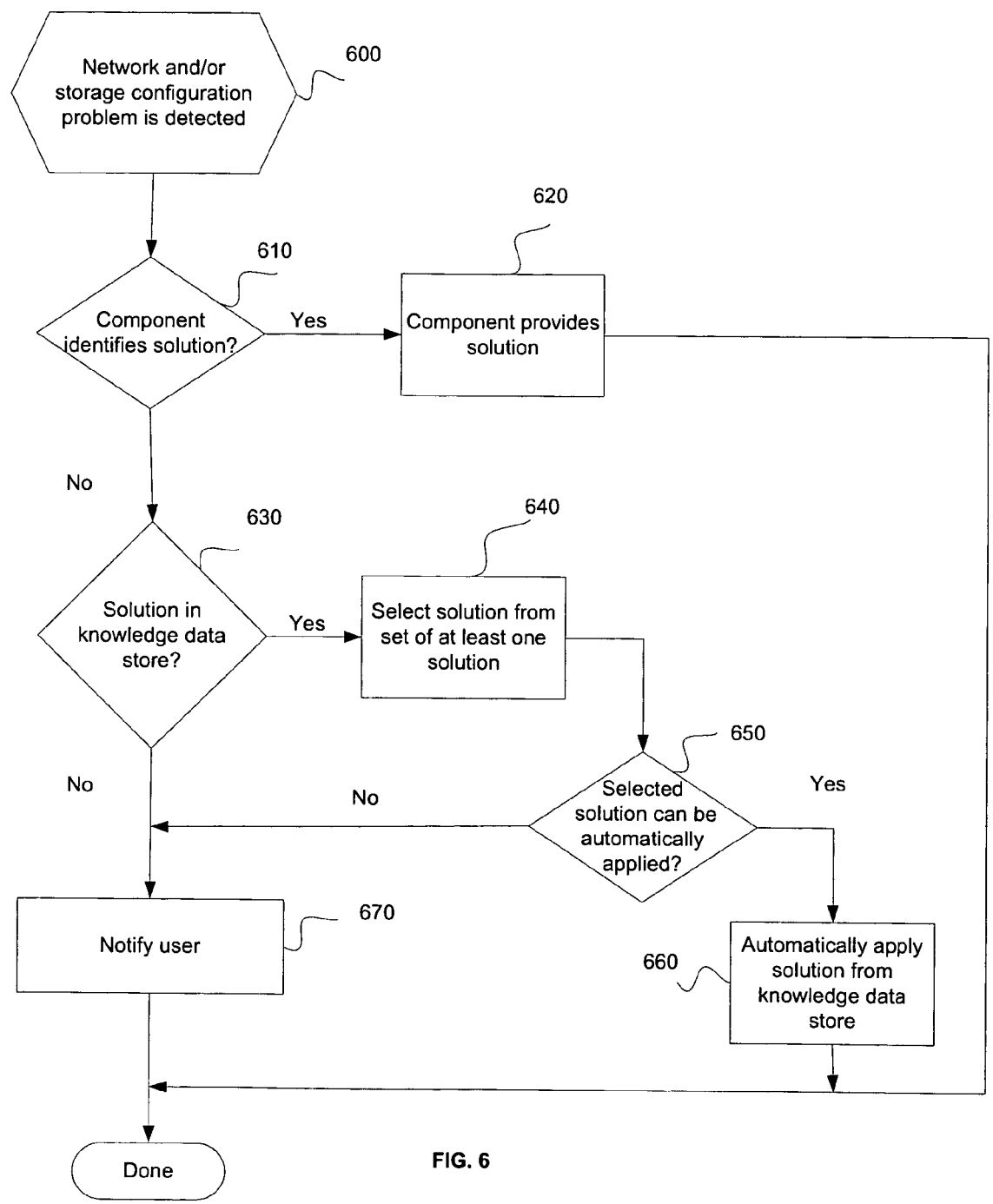
FIG. 6 illustrates logic for automatic correction in accordance with certain implementations of the invention.

FIG. 6 illustrates logic for automatic correction in accordance with certain implementations of the invention. Control begins at block 600 with the autonomic configuration system 150 detecting a network and/or storage related configuration problem. In addition to the proactive approach and the reactive approach, network and/or storage related configuration problems with the network may be detected in various ways. For example, the autonomic configuration system 150 may periodically interrogate each component of the network for its attributes and connectivity. Then, the autonomic configuration system 150 may perform a health check of each connection. Another network and/or storage related configuration problem detection technique involves the component reporting actual problems, such as I/O failures, as Common Information Model (CIM) indications, Network Management Protocol (SNMP) traps, or using other reporting techniques. CIM is a standard for an object-oriented model for managing information. The CIM standard is provided by the Distributed Management TaskForce (DMTF), Inc. For further information on the CIM standard, see "Specification for CIM Operations over HTTP," Version 1.1, May 2, 2002. SNMP may be described as a protocol for monitoring and managing components in a network. Functions supported by SNMP allow the request and retrieval of data, the setting or writing of data, and traps that signal the occurrence of events.

When a network and/or storage related configuration problem is detected, there are several ways to determine what needs to be done to solve the network and/or storage related configuration problem. In block 610, it is determined whether a component has identified a solution. If so, processing continues to block 620, otherwise, processing continues to block 630. In some cases, one component may directly identify what is needed in another component. For example, for a device driver configuration that requires a storage device having a particular vendor-unique Small Computer System Interface (SCSI) command, if the connected storage device does not posses the command, the device driver may be configured to not use the command or the device configuration, firmware, or microcode is updated to include the command. In block 620, the component provides a solution.

In block 630, it is determined whether at least one solution for the network and/or storage related configuration problem is available in the knowledge data store 176. If so, processing continues to block 640, otherwise, processing continues to block 660. A knowledge data store 176 is assembled by, for example, experts in the field of systems management, and made available either during program installation or as a live update process (e.g., via the Internet).

In block 640, when multiple solutions to the network and/or storage related configuration problem are available, one is automatically selected based on various factors. For example, some network and/or storage information may be included with each solution, and one solution may be selected based on how close an existing or hypothetical scenario is to the included network and/or storage information. Also, some factors may be, for example, that one solution works better for a component from a particular vendor or that one solution works better for a smaller network configuration than a larger network configuration. In certain alternative implementations, when there are multiple possible solutions, a user may be provided with an option to either select one of the multiple possible solutions or to allow automatic selection.

Some solutions in the knowledge data store may require user intervention. For example, if the network and/or storage related configuration problem detected is that a component is not receiving an electrical current, then a user may need to supply power to the component (e.g., by "plugging" the component into a power source). Other solutions are automatically applied. For example, if rezoning is desirable, then rezoning may be automatically performed. In block 650, it is determined whether the selected solution can be applied automatically. If the solution can be automatically applied, processing continues to block 660, otherwise, processing continues to block 670.

In block 660, the selected solution from the knowledge data store 176 is automatically applied. Thus, in certain implementations, for a given set of conditions, a best matching solution from the knowledge data store 176 is automatically applied to solve the network and/or storage related configuration problem.

In block 670, if the network and/or storage related configuration problem does not have a solution in the knowledge data store or may not be solved automatically, a user is notified. In certain implementations, if the user provides a solution, then the solution may be added to the knowledge data store 176.

Thus, implementations of the invention allow for constraints that are not hard-coded into the autonomic configuration system 150, allow new configuration constraints to be downloaded from constraint data stores, allow for both proactive and reactive checking of a network configuration, and allow for automatic correction of network and/or storage related configuration problems.

IBM and Tivoli are registered trademarks or common law marks of International Business Machines Corporation in the United States and/or other countries.

Additional Implementation Details

The described techniques for checking and repairing a network configuration may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, etc.). Code in the computer readable medium is accessed and executed by a processor. The code in which various implementations are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Thus, the "article of manufacture" may comprise the medium in which the code is embodied. Additionally, the "article of manufacture" may comprise a combination of hardware and software components in which the code is embodied, processed, and executed. Of course, those skilled in the art will recognize that many modifications may be made to this configuration without departing from the scope of the present invention, and that the article of manufacture may comprise any information bearing medium known in the art.

The logic of FIGS. 3-6 describes specific operations occurring in a particular order. In alternative implementations, certain of the logic operations may be performed in a different order, modified or removed. Moreover, operations may be added to the above described logic and still conform to the described implementations. Further, operations described herein may occur sequentially or certain operations may be processed in parallel, or operations described as performed by a single process may be performed by distributed processes.

The illustrated logic of FIGS. 3-6 may be implemented in software, hardware, programmable and non-programmable gate array logic or in some combination of hardware, software, or gate array logic.

Figure 7:
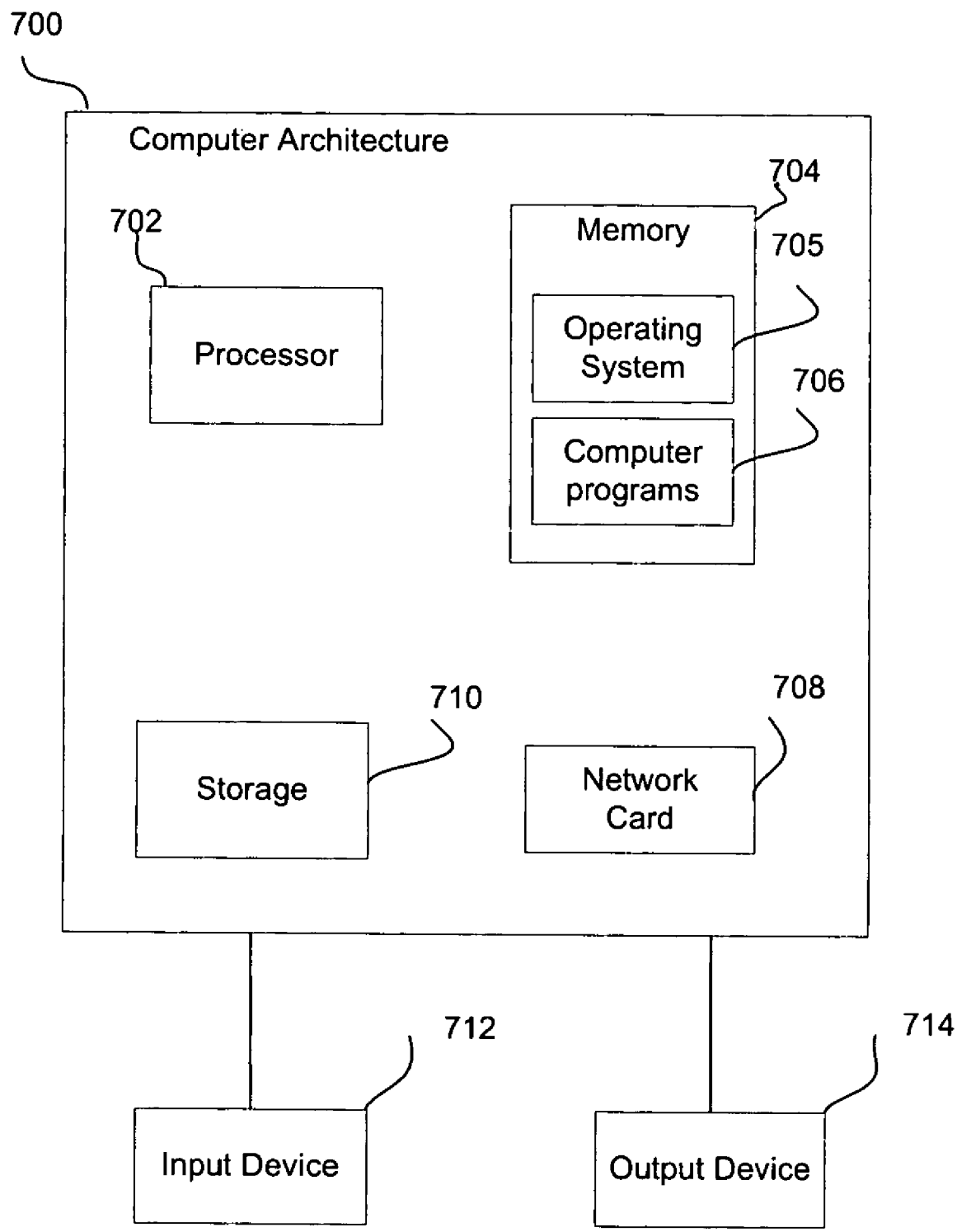
FIG. 7 illustrates an architecture of a computer system that may be used in accordance with certain implementations of the invention.

FIG. 7 illustrates an architecture of a computer system that may be used in accordance with certain implementations of the invention. Management server computer 120 may implement computer architecture 700. The computer architecture 700 may implement a processor 702 (e.g., a microprocessor), a memory 704 (e.g., a volatile memory device), and storage 710 (e.g., a non-volatile storage area, such as magnetic disk drives, optical disk drives, a tape drive, etc.). An operating system 705 may execute in memory 704. The storage 710 may comprise an internal storage device or an attached or network accessible storage. Computer programs 706 in storage 710 may be loaded into the memory 704 and executed by the processor 702 in a manner known in the art. The architecture further includes a network card 708 to enable communication with a network. An input device 712 is used to provide user input to the processor 702, and may include a keyboard, mouse, pen-stylus, microphone, touch sensitive display screen, or any other activation or input mechanism known in the art. An output device 714 is capable of rendering information from the processor 702, or other component, such as a display monitor, printer, storage, etc. The computer architecture 700 of the computer systems may include fewer components than illustrated, additional components not illustrated herein, or some combination of the components illustrated and additional components.

The computer architecture 700 may comprise any computing device known in the art, such as a mainframe, server, personal computer, workstation, laptop, handheld computer, telephony device, network appliance, virtualization device, storage controller, etc. Any processor 702 and operating system 705 known in the art may be used.

The foregoing description of implementations of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many implementations of the invention can be made without departing from the spirit and scope of the invention, the invention resides in the claims hereinafter appended.

What is claimed is:

1. A method for performing configuration checking of a network, comprising:

scanning a network data store for at least one transaction, wherein said transaction includes one of connecting components in said network, adding components to said network, updating components in said network, and rezoning components in said network;

generating at least one event for said transaction using a mapping of events to transactions;

for said event, obtaining configuration data associated with components in said transaction;

generating at least one trigger for said event, wherein said trigger is associated with at least one configuration policy;

comparing the said configuration policy associated with said trigger with said configuration data associated with said event for which said trigger was generated; and determining whether said configuration policy has been violated based on the comparison.

2. A method for performing proactive configuration checking of a network, comprising:

receiving a hypothetical network scenario, wherein said hypothetical network scenario represents a new network configuration that a system administrator wants to create;

generating at least one transaction based on said hypothetical network scenario, wherein said transaction includes one of connecting components in said hypothetical network scenario, adding components to said hypothetical network scenario, updating components in said hypothetical network scenario, and rezoning components in said hypothetical network scenario;

populating a network data store with configuration data for said transaction, wherein said configuration data includes configuration data for components in said hypothetical network scenario described by said transaction;

generating at least one event for said transaction using a mapping of events to transactions; and using configuration data associated with said event to determine whether a configuration policy has been violated.

3. A method for performing reactive configuration checking of a network, comprising:

receiving a request to perform configuration checking on an existing network configuration;

scanning a network data store for at least one transaction, wherein said transaction includes one of connecting components in said network, adding components to said network, updating components in said network, and rezoning components in said network;

generating at least one event for said transaction using a mapping of events to transactions; and using configuration data associated with said event to determine whether a configuration policy has been violated by determining whether the at least one transaction results in incompatibilities, performance issues, and availability issues, wherein said incompatibilities are conflicts between components in the network, said performance issues relate to whether a desired performance level is met, and said availability issues relate to whether there is a single point of failure in the network.

4. The method of claim 1, wherein said configuration policy is retrieved from a local policy data store.

5. The method of claim 4, wherein said configuration policy in the local policy data store is automatically updated with a configuration policy in a remote data store.

6. The method of claim 1, further comprising:

receiving a hypothetical network scenario, wherein said hypothetical network scenario represents a new network configuration that a system administrator wants to create;

generating at least one transaction based on the hypothetical network scenario;

populating the network data store with configuration data for said transaction; and after determining whether said configuration policy has been violated based on the comparison, rolling back said transaction.

7. The method of claim 1, further comprising:

receiving a request to perform configuration checking on an existing network configuration.

8. The method of claim 1, further comprising:

when said configuration policy has been violated, performing an action specified in that configuration policy.

9. The method of claim 8, wherein the action is at least one of logging an indication that the configuration policy has been generated, generating at least one policy violation event, sending a notification, and highlighting a network topology viewer that graphically depicts the network.

10. The method of claim 1, further comprising:

when said configuration policy has been violated,
accessing a solution in a knowledge data store; and
applying the solution so that said configuration policy is not violated.

11. The method of claim 1, further comprising:

when said configuration policy has been violated,
determining that a component in the network is able to provide a solution; and
allowing the component to apply the solution so that said configuration policy is not violated.

12. The method of claim 1, wherein determining whether said configuration policy has been violated further comprises identifying incompatibilities between components in the network, performance issues, and availability, wherein said incompatibilities are conflicts between components in said network, said performance relates to whether a desired performance level is met, and said availability relates to whether there is a single point of failure in said network.

13. The method of claim 2, further comprising:

rolling back said transaction by removing the configuration data for said transaction from the network data store.

14. The method of claim 3, further comprising:

when said configuration policy has been violated, automatically correcting the violation.

* * * * *